June 1, 1948.  F. R. LOETSCHER  2,442,422
METHOD OF MAKING BUILDING MATERIAL
Filed March 2, 1944
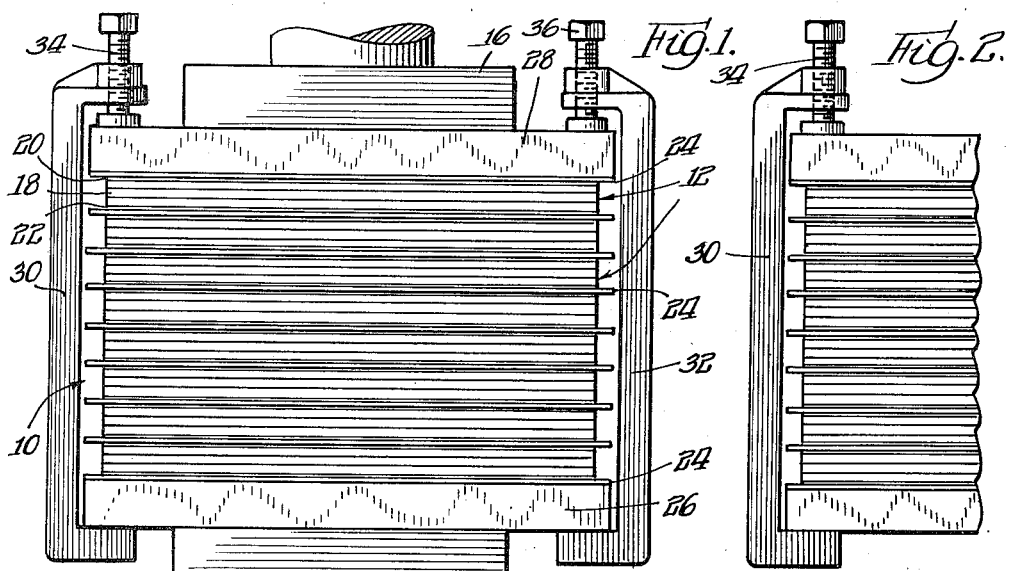
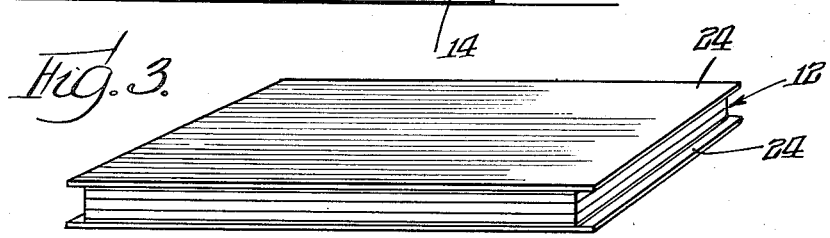
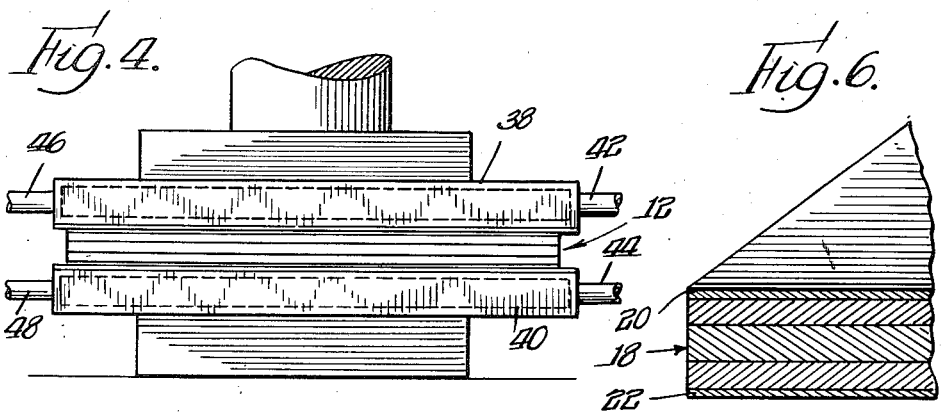
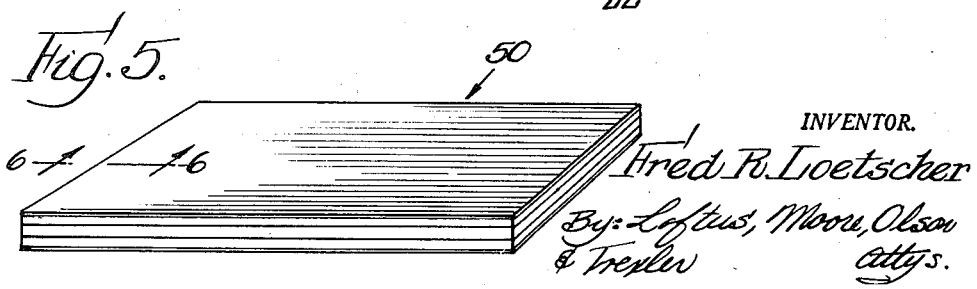
INVENTOR.
Fred R. Loetscher
By: Loftus, Moore, Olson & Trexler
attys.

Patented June 1, 1948

2,442,422

UNITED STATES PATENT OFFICE 2,442,422

METHOD OF MAKING BUILDING MATERIAL

Fred R. Loetscher, Dubuque, Iowa

Application March 2, 1944, Serial No. 524,685

12 Claims. (Cl. 154—133)

This invention relates to a method of making building material. More particularly, it relates to an improved method for making a woody sheet material having on at least one surface a sheet of fibrous material and impregnated with a synthetic resin composition and presenting a relatively smooth, hard surface.

In applicant's co-pending application, Serial No. 460,019, filed September 28, 1942, a new building material is described. This building material comprises a woody base, preferably plywood, having on at least one surface, and preferably two opposite surfaces, a sheet of fibrous material such as paper impregnated with a synthetic resin composition and securely bonded to the woody base by the synthetic resin composition. In accordance with the disclosure of this co-pending application the new material is formed by applying to the outer surface of a sheet of woody material a sheet of fibrous material impregnated with a synthetic resin composition which is flowable but which is adapted to be converted with the aid of heat and pressure to a hard composition. This assembly is then placed in a press and with a smooth plate, non-adherent to the resin, in contact with the resin-impregnated paper surface, the assembly is subjected to heat and pressure to cure the resin to the hard state, thereby bonding the sheet to the woody base and at the same time making the outer surface of the resin impregnated sheet smooth and hard.

It is an object of the present invention to provide an improved method for making building materials including a woody base carrying on its surface a resin-impregnated sheet of fibrous material which is bonded to the base by the synthetic resin and presents a hard surface which is waterproof and may be formed smooth or embossed.

A further object is to provide a method of making such materials which is more economical to carry out and which produces materials, the qualities of which are fully equal to those produced by previously known methods.

A more particular object is to provide a method of making such materials in which a large part of the operation is carried out without the aid of a hot press, thereby increasing the rate at which such building material can be made with a hot press of given capacity.

Other objects will appear hereinafter.

It has now been found that the foregoing objects are accomplished by applying to a surface of a woody base a layer of fibrous material impregnated with a curable thermosetting synthetic resin composition, then bonding said layer to said woody base by partially curing the synthetic resin under elevated pressure at ordinary temperature and finally completing the cure of the synthetic resin at elevated temperature. A preferred base is a woody sheet material, particularly plywood, and more particularly, fir plywood, and in accordance with a preferred procedure, in addition to the one or more laminations of a fibrous material, such as paper impregnated with a curable thermosetting synthetic resin, a layer of curable thermosetting synthetic resin is applied to the surface of the woody base prior to assembling the resin-treated fibrous sheet thereon. These assemblies are then stacked with separator plates or sheets formed of a hard material having a smooth surface to which the synthetic resin composition does not stick, preferably stainless steel, the stack being made up with such separator plates on the top and the bottom, and with other separator plates etxending between each pair of adjacent assemblies.

Any desired number of assemblies can be included in the stack, but it is found that particularly efficient operation is obtained when from about fifty to sixty of the assemblies are so stacked. This stack of assemblies or layups is then put under pressure in a press without heat. The preferred pressure is of the order of 125 to 140 pounds per square inch. While the stack is still in the press under such pressure, retaining clamps are applied which will hold the pressure and the stack is then removed from the press and allowed to stand for a period of time sufficient to permit the synthetic resin which bonds the fibrous layer to the base to at least partially set or cure.

Thereafter, but before the resin in the fibrous layer is set or cured, the pressure on the stack is released and each individual assembly is separately placed in a press together with separator plates as described which are arranged in contact with the resin-impregnated fibrous surface or surfaces of the assembly. In this press, pressure of the same general order set forth above is applied, together with heat. This operation causes the resin in the fibrous sheet material to flow and form a smooth surface and at the same time the setting or curing of the resin is completed.

In order that the invention may be better understood, reference is made to the accompanying drawings which form a part of this specification, and in which:

Figure 1 is a view in elevation of a stack of assemblies and separator plates under pressure between the plates of a press and with retaining clamps in position;

Figure 2 is a partial view in elevation showing the stack as it appears after removal from the press with a retaining clamp on the stack;

Figure 3 is a view in perspective of one of the assemblies sandwiched between separator plates;

Figure 4 is a view in elevation of an individual assembly undergoing the final heating and pressing between the plates of a press;

Figure 5 is a view in perspective of the finished building material; and

Figure 6 is an enlarged partial section on the line 6—6 of Figure 5.

Referring to Figure 1, a stack 10 including, for convenience in illustration, eight assemblies 12 is shown in place between the platens 14 and 16 of a press, not shown. Any desired type of press may be used. For example, very satisfactory results have been obtained with a hydraulic press such as is used in conventional veneering operations. Each assembly 12 includes a three-ply plywood base 18 having on its opposite surfaces sheets of fibrous material 20 and 22 which have been impregnated with a thermosetting synthetic resin, preferably a phenol-formaldehyde resin composition. Stainless steel separator plates 24 are positioned at the top and bottom of the stack and between each pair of adjacent assemblies 12.

As indicated above, before assembling the stack 10, the opposite surfaces of each sheet of plywood 18 are coated with a fluid phenol-formaldehyde resin adhesive. Alternatively, an urea-formaldehyde resin adhesive may be used. Following the coating and before the fibrous sheet is applied, a large portion of the vehicle or solvent for the resin is removed. A sheet of paper is impregnated with a fluid phenol-formaldehyde resin composition to form the sheets 20 and 22. An urea-formaldehyde composition may also be used for this purpose. These impregnated sheets 20 and 22 likewise have a large portion of the solvent removed by evaporation before they are assembled with the plywood base 18.

To aid in holding the pressure on the stack 10 after it is removed from the press plates 26 and 28 are provided to cooperate with the clamps 30 and 32. These clamps 30 and 32 are of conventional type and include threaded members 34 and 36 which are drawn up tightly against the plate 28 to hold the pressure on the stack 10. As indicated above, prior to applying the clamps 30 and 32, the stack 10, by means of the platens 14 and 16, is subjected to a pressure of about 125 to about 140 pounds per square inch. After this pressure has been applied for about five minutes the clamps 30 and 32 are then put in position and the threaded members 34 and 36 are drawn up sufficiently tightly to maintain this pressure when the pressure exerted through the platens 14 and 16 is released. The stack 10 with the clamps 30 and 32 thereon is then removed from the press, and is allowed to set for a period of from about two to about four hours. In order to promote the setting or hardening of that portion of the resin which secures the sheets 20 and 22 to the base 18, about 8%, by weight, of ammonium chloride, based on the weight (dry basis) of the resin, is incorporated as a catalyst or hardener in the resin varnish which is applied to the base 18. The heat which is subsequently applied under pressure in the hot press is not adequately supplied by the heated platens to this portion of the resin unless the assembly is maintained in the hot press longer than is necessary to set or cure the surface portion of the resin. By advancing the setting or cure of the portion of the resin securing the sheets 20 and 22 to the base 18 with a hardener the time required in the subsequent hot pressing step is thus materially decreased. After the stack 10 under pressure through the clamps 30 and 32 has been allowed to stand for a sufficient length of time to set the resin in the interior the pressure on the stack 10 is released and the clamps 30 and 32 are removed. At this point the resin in the fibrous layer is only partially cured.

The individual assemblies 12 are removed from the stack 10 and with the smooth-surfaced stainless steel pressing plates 24 on each of the opposite faces (as illustrated in Figure 3) are placed between the platens 38 and 40 (Figure 4) of a press, not shown. These platens 38 and 40 are heated, for example, by steam under pressure which enters through pipes 42 and 44 and is exhausted through pipes 46 and 48. In this press each individual assembly 12 is subjected to a slightly higher pressure than that previously used, in general on the order of 130 to 150 pounds per square inch, and a temperature of 300° F. to 320° F. is applied through the platens 38 and 40. Under these conditions the setting or cure of the resin in the fibrous layer is completed in about 10 minutes. During this operation the resin on the surface of the fibrous sheets 20 and 22 is caused to flow slightly and conform to the smooth-surfaced plates 24, thereby giving to the finished building material 50, illustrated in Figure 5, a hard, smooth surface on each of its opposite faces. As shown in Figure 6, the finished material 50 includes the plywood base 18 carrying on its two outer faces resin-impregnated fibrous sheets 20 and 22, these sheets 20 and 22 being securely bonded to the base by the synthetic resin.

While the above represents the preferred method of making building material in accordance with the present invention, an alternative procedure may be followed in some cases to advantage, particularly as regards cost of production. In accordance with the alternative method the procedure is the same up to the point where the stack of assemblies which have been allowed to stand under pressure for two to four hours is released and the individual assembiles 12 removed. At this point, in accordance with the alternative method, the assemblies without the plates 24 are finished simply by baking and drying the resin on the opposite faces. This may be accomplished, for example, by passing the partially cured assemblies through a device called a Coe drier. The Coe drier is a machine containing steam coils with driven rollers in between the coils so that the assembly 12 is baked therein for a period of time while passing through the dryer. The important difference between this modification and the first is that in this modification the cure of the resin is completed simply by the action of heat and without the aid of pressure applied during the time when the resin is being heated.

While the improved method which forms the subject matter of the present application is illustrated in connection with the use of a plywood base, it is to be understood that the invention is applicable to other types of base material, as for example, products similar to Masonite, or products which include a straight lumber core. In the present specification and claims the terms "wood" or "woody material" are utilized as defining plywood as well as any hard boards or manufactured synthetic boards of fibrous structure. The invention is particularly applicable, however, to the improvement of inferior plywood materials. The inferior plywoods include both softwood plywoods and hardwood plywoods. For instance, some so-called hardwood plywoods such as poplar, tupelo, cottonwood, or plywood made with veneers cut from woods having open grain such as ash and oak are considered inferior and may be materially improved by the process of this invention. The same is true for any plywoods having surface veneers with sound knots or pin holes or mineral streaks or brash wood, whether in soft wood or hard wood. The present process provides a means for covering up such defects and forming a smooth surface for painting with a one-coat finish. Thus the present invention is applicable to any type of plywood as well as to various other types of woody materials, but it is particularly applicable to fir plywood since it is with this type of wood that the improvement resulting from the present process is most marked.

Although the embodiment illustrated in the drawings in accordance with the preferred procedure has two oppositely disposed faces of the base material coated with the resin-impregnated paper, it is within the scope of the invention to apply paper to one surface only of the base, or to apply to one surface or to two oppositely disposed faces two or more layers of resin-impregnated paper instead of the single layers employed in the illustrated embodiment. Where more than one layer of resin-impregnated paper is to be applied to either the same surface or different surfaces of the base, the layers may be applied either together or in separate operations, as is most convenient. Furthermore, it is within the scope of the invention to employ other types of fibrous material instead of the preferred paper in the resin impregnated layer or layers. For example, cotton fabrics or other types of cloth may be used.

Any desired type of paper may be used in forming the surface layers, although preferably the paper will be of an absorbent type in order to enable it to take up the appropriate quantity of resin material when the latter is applied thereto. By way of illustration, kraft paper, good grades of wood pulp paper, paper made from Sparton fiber obtained from certain trees in South Carolina, and lignin base papers have been found satisfactory. The thickness of the paper may vary as desired; for example, paper having a thickness in the range from about .009 inch to about .014 inch has been found to give satisfactory results. To obtain the best results it is important to employ a good grade of paper.

Instead of applying a plain paper it is possible to give the building material a decorative finish in any of a wide variety of designs by coloring the paper which is to be applied to the base material or by printing a particular design thereon; for example, the paper could be printed to represent cloth, wood grain, fabric, leather, marble, etc. Thus a base material of inferior character such as fir plywood can be made to simulate hardwood grain such as mahogany or walnut by printing this grain on the paper which is impregnated with the resin and applied to the surface of the fir plywood by the method of the present invention. Alternatively, a paper having a solid color may be employed to give a building material having a surface of this color. It will be understood that paper colored or printed with a desired design is impregnated with a clear resin and then applied to the base as described above. Where the paper is to carry a design it is preferable to employ a very high grade type of paper in order to get good reproductions of the design. While the use of colored paper is preferred, building material having a colored surface may also be formed by incorporating an appropriate pigment in the synthetic resin with which the paper is impregnated.

The resin composition may be applied to the paper in any desired manner. It has been found particularly convenient, however, to impregnate the paper with the resin by passing the paper through a bath containing the resin dissolved or dispersed in a suitable fluid vehicle or solvent, preferably water or an organic solvent which is readily evaporated off. Both water-soluble and alcohol-soluble resins have been found satisfactory. In general, it is not necessary to prepare special resin compositions with which to impregnate the paper since commercial thermosetting synthetic resin solutions or dispersions may be employed, although some dilution may be preferred. For example, synthetic resin varnish as it comes from thee cooker is preferably diluted with some solvent such as water or alcohol, or a mixture of the two, or benzol before employing it for impregnation, the type of solvent used being dependent upon the type of resin to be diluted. While the degree of impregnation can be varied by varying the amount of solvent used, that is, by varying the concentration of resin solids in the treating solution or composition, other means are ordinarily provided to control impregnation. Accordingly, the concentration of resin solids in the composition is preferably kept within the relatively narrow limits of about 40% to about 50% resin solids, although both higher and lower concentrations may be used, if desired.

The other means referred to above which are usually provided to control impregnation are means such as doctor blades and pressure rolls. These serve to reduce the amount of liquid vehicle necessary in the impregnating composition to give a particular ratio of resin to paper in the finished article. The quality of the finished product is very substantially affected by the ratio of resin to paper in the impregnated sheet. In general, the higher the ratio of resin to paper, the smoother and harder the surface will be, and therefore a better quality surface is obtained with a higher degree of resin impregnation, but with a resultant increase in cost.

On a good grade of paper it is found that a very satisfactory product is obtained where the paper layers contain about 40 parts of resin solids on a dry basis, by weight, per 60 parts of paper, by weight. In the case of weaker papers, such as ground wood pulp paper, better results are usually obtained by increasing the ratio of resin to the paper, for example, to a point where the applied layer includes one part of resin solids on a dry basis, by weight, to each part, by weight, of paper. On the other hand, with papers such as lignin base papers, the quantity of resin may be very materially decreased, for example, to the point where the applied layer includes only 20 parts of resin solids on a dry basis, by weight, per 80 parts, by weight, of paper. For the bulk of the relatively good grade papers to be employed, however, it is found that paper-resin ratios in parts, by weight, and on a dry solids basis will be included in the range from about 60–40 to about 75–25, although it is within the scope of the invention to apply resin-impregnated paper having any desired quantity of resin in the paper. The disadvantage of to low a resin content, particularly below 10%, is that the surface layer then has too little moisture resistance and thus allows moisture penetration and subsequent grain raising of the plywood, for example. The cost is, of course, increased as the resin content is increased, but within the preferred range the quality is generally improved to an extent sufficient to justify the increased cost. On the other hand, increasing the resin content above about 50% does not usually give any appreciable increase in quality, and with too great a resin content crazing of the finish may occur, and in addition, the surface becomes very brittle and even with normal handling will tend to crack.

Although means are available for cutting to a minimum the quantity of vehicle or solvent in the resin composition with which the paper or fibrous material is impregnated, it is generally preferable to dry out or evaporate a considerable portion of the vehicle in the resin composition before the resin is cured or set. Complete removal of the vehicle is not preferred, however, since better flow is obtained on pressing where at least some small amount of the vehicle is present. Very satisfactory results have been obtained by drying the paper layers to about 10% volatile material or vehicle content. This quantity gives adequate flow on pressing and at the same time is low enough so that it does not interfere with the proper and rapid bonding of the fibrous layers to the woody base. The invention is not limited to drying to exactly 10%, however, and contemplates variations both above and below this amount.

Any desired thermosetting type resin may be used to impregnate the paper and to bond the paper to the woody base. Outstanding among the resins which are particularly suitable are phenol-formaldehyde resins, cresol-formaldehyde resins, melamine-formaldehyde resins, urea-formaldehyde resins and phenol-furfural resins. In addition to the constituents of the resin itself, treating solutions may contain various additional ingredients which are adapted to improve or vary the qualities of the paper layer. For example, as described above, pigments may be employed to give a particular color or fillers may be employed with or without other conventional ingredients included in resin compositions.

Among the various conventional ingredients which may be included in the resin compositions are hardeners. These generally are employed only in the resin which is applied to the woody base and serve to bond the fibrous layer to the woody base. While hardeners may also be employed in the resin with which the paper or fibrous layer is impregnated, it is preferable that the resin composition employed to bond the paper layer to the woody base be adapted to set more rapidly than the composition with which the fibrous layer is impregnated, since the preferred procedure in accordance with the present invention depends upon setting the resin which bonds the fibrous layer to the base during the period when the assembly 12 is pressed in the absence of heat so that when the assembly is ready for the heating step the only portion of the resin which is not substantially completely cured is that in the fibrous layer. The materials which may be added to resin compositions in order to promote a more rapid setting or hardening or cure are well known in the art. In the case of phenol-formaldehyde resins, for example, they include acid materials or acid salts, nitrogen bases and their salts, etc. Quantities suited to the purposes of the present invention are illustrated by the specific example given above and with this illustration the possible variations in the amounts of any particular hardener will be readily apparent to those skilled in the art.

In order to obtain a smooth, hard surface on the building material and avoid sticking in the various steps it is important, as indicated above, to have the resin-impregnated fibrous material surfaces in contact with a smooth-surfaced hard material to which the resin will not stick. Very few materials possess the necessary properties. Stainless steel, which is described above, is one and in fact is the preferred material. Chromium plated steel plates, however, also give satisfactory results. The plates of hard material must be smooth-surfaced in order to give a building material with a smooth surface since these plates serve to mold the surface of the building material and any non-uniformity in the plates will be reflected in the surface of the finished article made with the plates. With this idea in mind, it will also be apparent that the plates may be as thick as desired, but that thick plates are not necessary since the plates need only be thick enough to mold the surface of the assembly. For example, plates as thin as 1/64 of an inch or even thinner may be used. With the very thin plates, however, it is preferable to employ pressures in the lower portion of the preferred range in order to avoid injury to the plates.

It further follows from the above that by using embossed plates instead of the smooth-surfaced plates an embossed surface will result. Thus plates grained like wood grain veneers will leave an imprint of wood graining on the surface since every conformation of the plate surface is transferred to the finish of the building material 50.

It is also within the scope of the invention to employ a paper separator instead of the hard, smooth-surfaced plates. A paper such as glassine paper has been found suitable for this purpose. Where paper separators are employed it is preferable to apply one sheet of the paper over each of the resin-impregnated fibrous layer surfaces; that is, where two such surfaces are adjacent a sheet of glassine paper is applied to each. In connection with this embodiment of the invention it should be understood that paper separators do not give as smooth a finish as is obtainable with plates such as stainless steel plates. The glassine paper is not waterproof and it is attacked by almost any solvent. The glassine or the like does, however, stick to each panel but not to the glassine on another panel so that it does give satisfactory separation. It has been found particularly useful in making up thin sheets of the building material for special purposes and has the advantage that it reduces the labor involved.

The conditions of temperature, pressure and time employed in the various steps of this process will depend very largely upon the particular resin composition with which the fibrous layer has been impregnated and upon the particular resin composition employed to bond the fibrous layer to the woody base. As is well known, the setting of thermosetting resins can be brought about by a wide variety of combinations of temperature and pressure applied over various periods of time. The use of hardeners in the resin compositions alters the appropriate conditions somewhat, although variation is still possible. The selection of the particular conditions to be employed in setting the resin in the present case is determined to some extent by the maximum pressure which can be applied to the plywood or other woody base without crushing this base or unduly compressing it.

The pressures generally employed during the curing of thermosetting resins are considerably higher than those used in accordance with the present invention. It has been found, however, that these lower pressures may be employed quite satisfactorily by using hardeners and relatively long setting periods and/or by using relatively high temperatures over a sufficient period of time. It is within the scope of the present invention to employ pressures as low as 100 pounds per square inch. These are not generally preferred however. The preferred range of pressure is from about 125 to about 150 pounds per square inch and in any given case the pressure should be sufficient to cause the resin to flow. Pressures much above 200 pounds per square inch are not generally necessary and may adversely affect the relatively soft plywoods such as fir plywood. Somewhat higher pressures may be used with hardwood plywoods, for example, pressures as high as 300 pounds per square inch could be used with hardwood plywood without injuring the wood and thus are within the scope of the invention. Thus any desired pressure may be used which does not cause any substantial permanent injury to the particular woody base involved. By way of illustration, with pressures of the order of 125 to 140 pounds per square inch it has been found that the above described phenol-formaldehyde resin composition containing 8%, based on the weight (dry basis) of the resin, of ammonium chloride as a hardener is substantially completely cured in two to four hours, and that the above described phenol-formaldehyde resin composition with which the paper sheets 20 and 22 are impregnated after standing for the same period of time under the same pressures is only partially cured but may then be completely cured with pressures of the order of 130 to 150 pounds per square inch at temperatures of 300° F. to 320° F. in a period as short as ten minutes. Similar results have been obtained with cresol-formaldehyde resin compositions. With melamine-formaldehyde resin compositions under otherwise similar conditions somewhat lower temperatures of the order of 265° F. to 285° F. are adequate to complete the cure in the ten minute period. These illustrative conditions will readily indicate to those skilled in the art suitable conditions with other resin compositions.

The outstanding advantage of the present invention is that it permits from one and one half to two times as much production with a hot press of given capacity or where the material is finished in a device such as the Coe drier it permits the elimination of the hot press. The commercial process formerly used, as described in the co-pending application referred to above, provides that the entire curing of the resin in the fibrous layer and the resin which forms the bond between this layer and the woody base be accomplished under pressure in a press with heated platens. In this procedure it is necessary to maintain the assembly in the press long enough to permit the heat to penetrate through the fibrous layer and heat the resin bonding the fibrous layer to the woody base to curing temperature. In accordance with this procedure it is only necessary to heat the resin in the fibrous layer during the second or hot pressing operation, since the resin bonding this layer to the woody base has been cured substantially completely in the first step. Where the former operation required fifteen to twenty minutes in a hot press, ten minutes is adequate when operating in accordance with the present invention as disclosed above. An increase in production of 50 to 100% therefore becomes possible with a hot press of given capacity.

When operating in accordance with the preferred procedure the foregoing advantage is obtained without any loss in the quality of the product. Where smooth surfaced stainless steel separator plates as described above are employed the finished building material has a smooth hard surface which can be finished with a one-coat paint finish. Where the woody base is plywood, particularly fir plywood, and the fibrous layer is paper, it is found that grain raising, which is a big objection to fir plywood, is eliminated, a surface with better wearing qualities than those of the plywood surface is obtained, and that the surface is more sanitary. The treated plywood moreover is only slightly more dense than the plywood base itself. Also the plywood with the resin impregnated paper thereon exhibits greatly increased strength and considerably less tendency to warp, due at least in part to the fact that the water absorption of the plywood is greatly decreased.

Where paper separators are employed the finish is not quite so smooth and the water resistance not quite as great, but the other characteristics are the same as those obtained by the method of applicant's co-pending application, with the important exception that the cost of manufacture is very materially decreased by the method of the present invention. The same is also generally true for material prepared in accordance with that modification of the present invention in which the curing of the resin in the fibrous layer is completed at elevated temperature but at ordinary pressure in a device such as the Coe drier. Both these alternative methods, like the preferred method, are effective to eliminate the disadvantage of grain raising with products having a base of fir plywood or other plywood which is subject to grain raising.

The uses to which woody base material such as plywood, and particularly fir plywood, is adapted when one or both surfaces have one or more layers of resin impregnated fibrous material, such as paper, applied thereto, as described herein, are many in number. For example such a product may be used for wall panel, wainscot, for trunks, suitcases and boxes of various kinds which require non-scuff properties, for table tops, kick plates and push plates, inspection table tops, and for other uses too numerous to mention.

Many additional advantages of the present invention will appear from the foregoing description.

It is apparent that many widely different embodiments of this invention may be made without departing from the spirit and scope thereof, and therefore it is not intended to be limited except as indicated in the appended claims.

I claim:

1. A method of forming an article having a woody base which comprises applying to a surface of the woody base a layer of fibrous material impregnated throughout its full thickness with a curable thermosetting synthetic resin composition adapted to be cured at least partially with elevated pressure alone, then partially curing the synthetic resin under elevated pressure alone to bond said layer to said woody base and form an integral body and thereafter completing the cure by subjecting the article to elevated temperature with the resin impregnated surface in contact with a smooth-surfaced separator layer and under an elevated pressure sufficient to cause the resin to flow.

2. A method of forming an article having a woody base which comprises applying to a surface of the woody base a layer of fibrous material impregnated throughout its full thickness with a curable thermosetting synthetic resin composition adapted to be cured at least partially with elevated pressure alone, then partially curing the synthetic resin under elevated pressure alone to bond said layer to said woody base and form an integral body and thereafter completing the cure by subjecting the assemblies to elevated temperature and elevated pressure applied to each resin surface through a hard material in contact therewith which separates readily from the resin, the last named elevated pressure being high enough to cause the resin to flow sufficiently to conform to the surface of said hard material.

3. A method of forming an article having a woody base which comprises applying to a surface of the woody base a coating of a thermosetting synthetic resin composition adapted to be cured substantially completely with elevated pressure alone, applying to said coating a layer of fibrous material impregnated throughout its full thickness with another thermosetting synthetic resin composition which under equivalent pressure at ordinary temperature cures more slowly than said first named synthetic resin composition, then substantially completely curing the first named synthetic resin composition under elevated pressure alone to bond said layer to said woody base and form an integral body and thereafter before the synthetic resin composition impregnated in said fibrous layer is completely cured applying heat to each resin impregnated layer to complete the cure of the resin therein at elevated temperature.

4. A method of forming an article having a woody base which comprises applying to a surface of the woody base a coating of a thermosetting synthetic resin composition adapted to be cured substantially completely with elevated pressure alone, applying to said coating a layer of fibrous material impregnated throughout its full thickness with another thermosetting synthetic resin composition which under equivalent pressure at ordinary temperature cures more slowly than said first named synthetic resin composition, stacking a plurality of such assemblies with a separator sheet of hard material in contact with each resin surface, the resin contacting surface of said separator being adapted to separate readily from the resin, then substantially completely curing the first named synthetic resin composition under elevated pressure alone applied to the stack to bond the fibrous layer in each assembly to the associated woody base and form an integral body, and thereafter before the synthetic resin composition impregnated in said fibrous layer is completely cured, removing the assemblies from said stack and applying heat and pressure to each resin impregnated layer through a separator in contact therewith as aforesaid to complete the cure of the resin therein at elevated temperature, the last named pressure being high enough to cause the resin to flow sufficiently to conform to the surface of said separator sheet.

5. A method of forming an article having a plywood base which comprises applying to the opposite faces of the plywood base a coating of thermosetting synthetic resin composition adapted to be cured substantially completely with elevated pressure alone, applying to each of said coatings a layer of paper impregnated throughout its full thickness with another thermosetting synthetic resin composition which under equivalent pressure at ordinary temperature cures more slowly than said first named synthetic resin composition, stacking a plurality of such assemblies with a separator sheet of hard material on each end of the stack and between each pair of adjacent assemblies, the resin contacting surfaces of said separators being adapted to separate readily from the resin, then substantially completely curing the first named synthetic resin composition under elevated pressure alone applied to the stack to bond the paper layers in each assembly to the plywood base and form an integral body, and thereafter before the synthetic resin impregnated in said paper layer is completely cured, removing the assemblies from said stack and with separators as aforesaid in contact with each of the resin impregnated paper layers applying heat and pressure through the separators to complete the cure of the resin in the paper layers at elevated temperature, the last named pressure being high enough to cause the resin to flow sufficiently to conform to the surface of said separator sheet.

6. A method of forming an article having a plywood base which comprises applying to the opposite faces of the plywood base a coating of thermosetting synthetic resin composition adapted to be cured substantially completely with elevated pressure alone, applying to each of said coatings a layer of paper impregnated throughout its full thickness with another thermosetting synthetic resin composition which under equivalent pressure at ordinary temperature cures more slowly than said first named synthetic resin composition, stacking a plurality of such assemblies with a separator sheet of stainless steel on each end of the stack and between each pair of adjacent assemblies, the resin contacting surfaces of said separators being smooth, then substantially completely curing the first named synthetic resin composition under elevated pressure alone applied to the stack to bond the paper layers in each assembly to the plywood base and form an integral body, and thereafter before the synthetic resin impregnated in said paper layer is completely cured, removing the assemblies from said stack and with separators as aforesaid in contact with each of the resin impregnated paper layers applying heat and pressure through the stainless steel separators to complete the cure of the resin in the paper layers at elevated temperature, the last named pressure being high enough to cause the resin to flow sufficiently to conform to the surface of said separator sheet.

7. A method of forming an article having a woody base which comprises applying to a surface of the woody base a coating of a thermosetting synthetic resin composition adapted to be cured substantially completely with elevated pressure alone, applying to said coating a layer of fibrous material impregnated throughout its full thickness with another thermosetting synthetic resin composition which under equivalent pressure at ordinary temperature cures more slowly than said first named synthetic resin composition, stacking a plurality of such assemblies with a separator sheet of hard material in contact with each resin surface, the resin contacting surface of said separator being adapted to separate readily from the resin, then substantially completely curing the first named synthetic resin composition under about 100 to 300 pounds per square inch pressure alone applied to the stack to bond the fibrous layer in each assembly to the associated woody base and form an integral body, and thereafter before the synthetic resin composition impregnated in said fibrous layer is completely cured, removing the assemblies from said stack and applying heat and a pressure of about 100 to about 300 pounds per square inch to each resin impregnated layer through a separator in contact therewith as aforesaid to complete the cure of the resin therein at elevated temperature, the last named pressure being high enough to cause the resin to flow sufficiently to conform to the surface of said separator sheet.

8. A method of forming an article having a plywood base which comprises applying to the opposite faces of the plywood base a coating of thermosetting synthetic resin composition adapted to be cured substantially completely with elevated pressure alone, applying to each of said coatings a layer of paper impregnated throughout its full thickness with another thermosetting synthetic resin composition which under equivalent pressure at ordinary temperature cures more slowly than said first named synthetic resin composition, stacking a plurality of such assemblies with a separator sheet of hard material on each end of the stack and between each pair of adjacent assemblies, the resin contacting surfaces of said separators being adapted to separate readily from the resin, then substantially completely curing the first named synthetic resin composition under about 100 to about 300 pounds per square inch pressure alone supplied to the stack to bond the paper layers in each assembly to the plywood base and form an integral body, and thereafter before the synthetic resin impregnated in said paper layer is completely cured, removing the assemblies from said stack and with separators as aforesaid in contact with each of the resin impregnated paper layers applying heat and a pressure of about 100 to about 300 pounds per square inch through the separators to complete the cure of the resin in the paper layers at elevated temperature, the last named pressure being high enough to cause the resin to flow sufficiently to conform to the surface of said separator sheet.

9. A method of forming an article having a plywood base which comprises applying to the opposite faces of the plywood base a coating of thermosetting synthetic resin composition including a vehicle and adapted to be cured substantially completely with elevated pressure alone, reducing the vehicle content to about 10% based on the weight of the resin, applying to each of said coatings a layer of paper impregnated throughout its full thickness with another thermosetting synthetic resin composition in which layer following impregnation the vehicle content has been reduced to about 10% based on the weight of the resin and which resin composition under equivalent pressure at ordinary temperature cures more slowly than said first named synthetic resin composition, stacking a plurality of such assemblies with a separator sheet of stainless steel on each end of the stack and between each pair of adjacent assemblies, the resin contacting surfaces of said separators being smooth, then substantially completely curing the first named synthetic resin composition under about 100 to about 300 pounds per square inch pressure alone applied to the stack to bond the paper layers in each assembly to the plywood base and form an integral body, and thereafter before the synthetic resin impregnated in said paper layer is completely cured, removing the assemblies from said stack and with separators as aforesaid in contact with each of the resin impregnated paper layers applying heat and a pressure of about 100 to about 300 pounds per square inch through the stainless steel separators to complete the cure of the resin in the paper layers at elevated temperature, the last named pressure being high enough to cause the resin to flow sufficiently to conform to the surface of said separator sheet.

10. A method of forming an article having a woody base which comprises applying to a surface of the woody base a layer of fibrous material impregnated throughout its full thickness with a curable thermosetting synthetic resin composition adapted to be cured at least partially with elevated pressure alone, stacking a plurality of such assemblies with a separator in contact with each resin surface, then partially curing the synthetic resin under elevated pressure alone applied to the stack to bond the fibrous layer in each assembly to the associated woody base and form an integral body, and thereafter completing the cure by subjecting the assemblies individually to elevated temperature and elevated pressure applied to each resin surface through a hard material in contact therewith which separates readily from the resin, the last named elevated pressure being high enough to cause the resin to flow sufficiently to conform to the surface of said hard material.

11. Method of forming an article having a woody base which comprises applying to a surface of the woody base a layer of fibrous material impregnated throughout its full thickness with a curable thermosetting synthetic resin composition adapted to be cured at least partially with elevated pressure alone, said layer containing from about 10% to about 50%, by weight on a dry solids basis, of synthetic resin all based on the total weight of fibrous material and resin on a dry solids basis, then partially curing the synthetic resin under elevated pressure alone to bond said layer to said woody base and form an integral body and thereafter completing the cure by subjecting the article to elevated temperature with the resin-impregnated surface in contact with a hard material which separates readily from the resin, and under an elevated pressure sufficient to cause the resin to flow and conform to the surface of said hard material.

12. A method of forming an article having a plywood base which comprises applying to a surface of the plywood base a layer of paper impregnated throughout its full thickness with a curable thermosetting synthetic resin composition adapted to be cured at least partially with elevated pressure alone, stacking a plurality of such assemblies with a hard smooth-surfaced separator in contact with each resin surface, then partially curing the synthetic resin under elevated pressure alone applied to the stack to bond the paper layer in each assembly to the associated plywood base and form an integral body, and thereafter completing the cure by subjecting the assemblies individually to elevated temperature and elevated pressure applied to each resin surface through one of said separators in contact therewith, the last named elevated pressure being high enough to cause the resin to flow sufficiently to conform to the surface of said separator.

FRED R. LOETSCHER.

REFERENCES CITED

The following references are of record in the file of this patent:

UNITED STATES PATENTS

| Number | Name | Date |
|---|---|---|
| 1,410,899 | Duncan | Mar. 28, 1922 |
| 1,597,539 | Novotny | Aug. 24, 1926 |
| 1,673,239 | Groff | June 12, 1928 |
| 1,776,790 | Harvey et al. | Sept. 30, 1930 |
| 1,779,426 | Frederick | Oct. 28, 1930 |
| 1,997,359 | Cochrane | Apr. 9, 1935 |
| 2,115,496 | Maters | Apr. 26, 1938 |
| 2,227,212 | Beck | Dec. 31, 1940 |
| 2,333,875 | Schmidt | Mar. 4, 1941 |
| 2,343,740 | Birmingham | Mar. 7, 1944 |